United States Patent [19]

Brooks et al.

[11] Patent Number: 5,016,838
[45] Date of Patent: May 21, 1991

[54] AIRCRAFT TIRE HAVING ASYMMETRIC TREAD

[75] Inventors: Lawrence W. Brooks; Thomas A. Dwenger, both of Uniontown, Ohio

[73] Assignee: The Goodyear Tire & Rubber Company, Akron, Ohio

[21] Appl. No.: 94,969

[22] Filed: Sep. 8, 1987

[51] Int. Cl.⁵ ............................................. B60C 11/06
[52] U.S. Cl. ............................ 244/103 R; 152/209 A; 152/209 R
[58] Field of Search ............ 152/209 A, 209 R, 209 B, 152/209 D, 455, 456; 244/103 R, 100 R; D12/136

[56] References Cited

U.S. PATENT DOCUMENTS

| | | | |
|---|---|---|---|
| T973,007 | 8/1978 | Beyers | 152/209 A |
| 2,281,359 | 4/1942 | Kenner | 152/209 A |
| 2,534,869 | 12/1950 | Jones | |
| 2,612,929 | 10/1952 | Yeggy | 152/209 R |
| 3,155,135 | 11/1964 | Klenk | 152/209 R |
| 3,286,756 | 11/1966 | Ellenreider et al. | 152/209 R |
| 3,554,259 | 1/1971 | Webb | 152/209 A |
| 3,880,218 | 4/1975 | Brajenovich | 152/209 R |
| 4,284,115 | 8/1981 | Ohnishi | 152/209 B |
| 4,429,728 | 2/1984 | Ippen et al. | 152/209 A |
| 4,446,901 | 5/1984 | Endo et al. | 152/209 R |
| 4,456,046 | 6/1974 | Miller | 152/209 R |

FOREIGN PATENT DOCUMENTS 1505108 4/1969 Fed. Rep. of Germany .
1588575 4/1981 United Kingdom ........... 152/209 A Primary Examiner—Michael W. Ball
Assistant Examiner—Geoffrey L. Knable
Attorney, Agent, or Firm—L. R. Drayer

[57] ABSTRACT

A tire (10) suitable for use on an aircraft equippped with cambered landing gear has a symmetrical carcass structure (11) and belt structure (12) but has an asymmetrical tread portion (16). On one side of a central groove (17) the tread portion is devoid of any grooves, but on the other side of the central groove a number of grooves (18, 19) extend circumferentially about the tread.

2 Claims, 3 Drawing Sheets

AIRCRAFT TIRE HAVING ASYMMETRIC TREAD

The present invention relates generally to tires suitable for use on aircraft and more specifically to an aircraft tire having an asymmetric tread structure.

It is generally recognized in the tire art that tires suitable for use on aircraft must be capable of operating under conditions wherein the tires are subjected to very high speeds and large loads as compared to tires used on automobiles, busses, trucks or similar earthbound vehicles. As used herein and in the claims, a tire is "suitable for use on an aircraft" if the tire is of a size and load range, or ply rating, specified in either the *YEARBOOK OF THE TIRE AND RIM ASSOCIATION* or in the *YEARBOOK OF THE EUROPEAN TIRE AND RIM TECHNICAL ORGANIZATION,* for the year in which the tire is manufactured, or in the then current U.S. Military Specification "MIL-T-5041".

One particular application for aircraft tires that is known to cause uneven wear of the tread portion of tires currently in use is an aircraft equipped with cambered landing gears. A "cambered landing gear" is a landing gear in which the axle on which the tire rotates is not designed to be parallel to the runway on which the aircraft is traveling. This causes uneven wear laterally across the tire treads because the camber configuration of the landing gear shifts most of the load to one side of the tire. Attempts have been made to overcome this uneven tread wear problem, and one such attempted solution is described in U.S. Pat. No. 3,554,259. However, the tire taught in that patent has one tread shoulder that is significantly thicker than the other tread shoulder which could cause heat build-up and lead to unacceptable product performance. Furthermore, the tire taught in this prior art patent has grooves in the portion of the tread that will be subjected to the heaviest load by a cambered landing gear structure which would make the tread subject to excessive tread wear.

There is provided in accordance with one aspect of the present invention a pneumatic tire suitable for use on an aircraft comprising: (a) a carcass structure and belt structure which are symmetrical with respect to a centerplane that is perpendicular to the axis of rotation of the tire and is disposed midway between a pair of sidewall portions of the tire; and (b) a tread portion disposed radially outwardly of said carcass structure and belt structure, the tread portion having a radially outer surface that generally follows a single radius of curvature across a central portion of the tread with the center of said radius of curvature being located on said centerplane, a central groove in the tread portion extends circumferentially thereabout and is intersected by said centerplane, on one side of the central groove the tread portion is devoid of any grooves and on the other side of the central groove the tread portion has at least two grooves therein that extend circumferentially thereabout, said central portion extending on each side of said centerplane a lateral distance at least equal to the distance from the centerplane to the laterally inner edge of the laterally outermost circumferentially extending groove.

To acquaint persons skilled in the art with the principles of the invention, a presently preferred embodiment illustrative of the best mode now contemplated for the practice of the invention is described herein making reference to the attached drawings forming a part of the specification and in which drawings.

Figure 1:
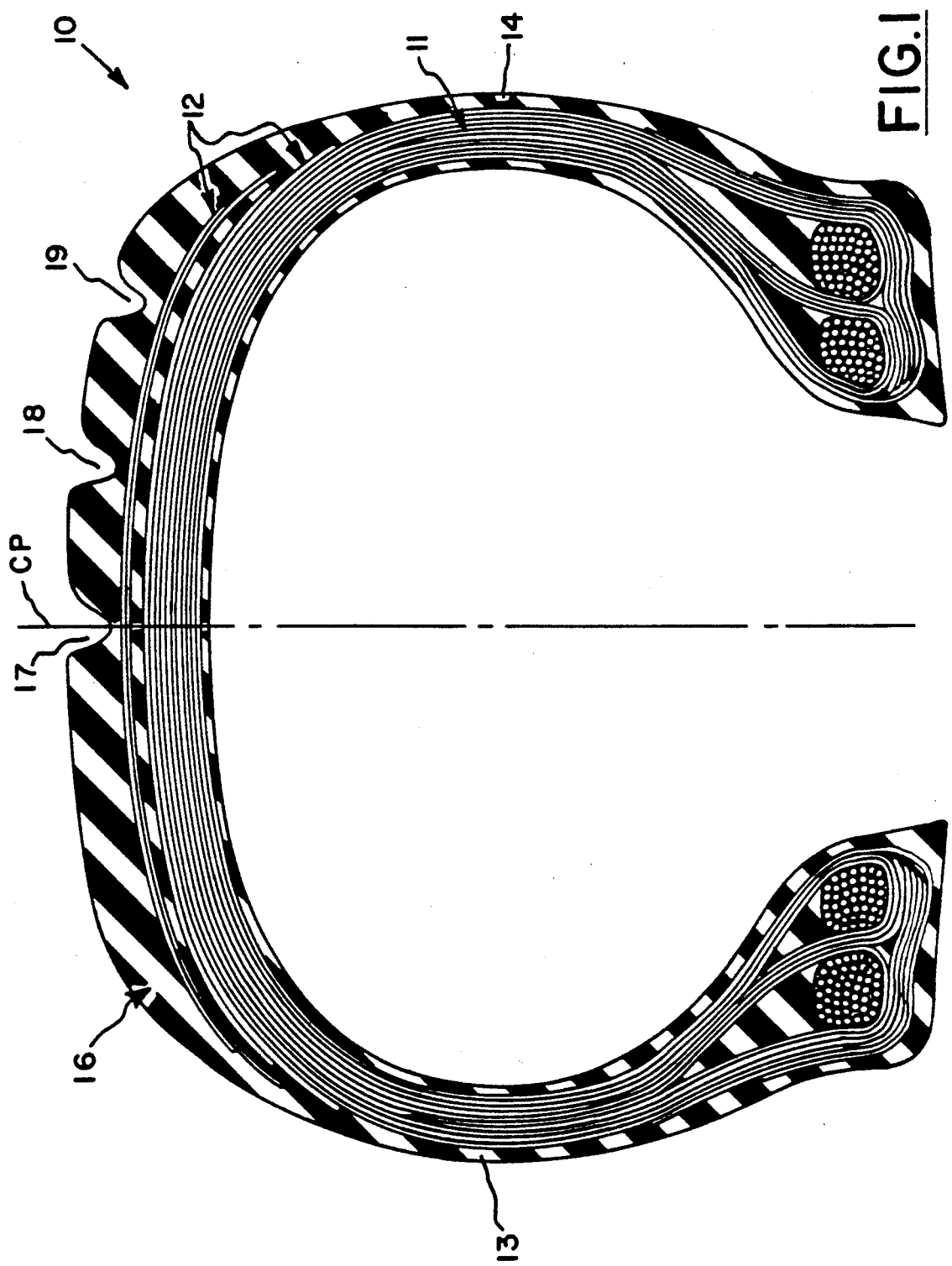
FIG. 1 is a cross-sectional view of a tire taken in a plane that includes the axis of rotation of the tire.
Figure 2:
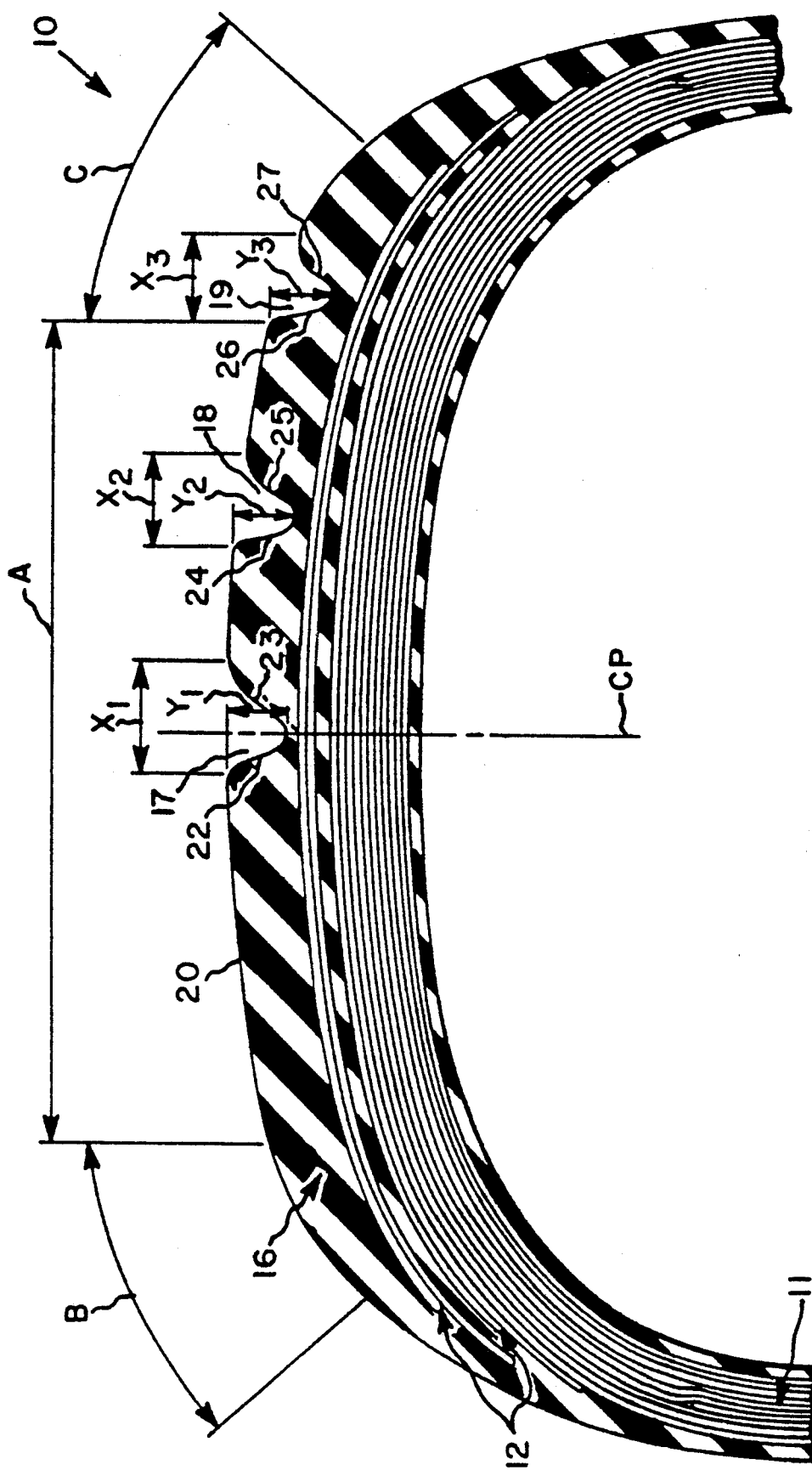
FIG. 2 is an enlarged fragmentary view of the crown portion of the tire shown in FIG. 1.

A pneumatic tire 10 suitable for use on an aircraft has a carcass structure 11 and a belt structure 12 which are symmetrical with respect to a centerplane CP. The centerplane CP is perpendicular to the axis of rotation of the tire and is disposed midway between a pair of sidewall portions 13,14 of the tire. The carcass structure may comprise any suitable reinforcing material such as nylon, and the carcass structure may be either of the biased ply or radial ply construction, each of which is well known in the tire art. The belt structure 12 is disposed radially outwardly of the carcass structure 11 and may be reinforced with cords of any suitable material such as nylon, aramid or steel. The particular configuration of the belt plies, that is to say any desired combination of folded and unfolded plies, is not believed to be critical to the practice of the present invention.

A tread portion 16 is disposed radially outwardly of the carcass structure 11 and belt structure 12 in a crown portion of the tire.

As used herein, the terms "radial " and "radially " refer to directions going towards or away from the axis of rotation of the tire. As used herein, the terms "lateral " and "laterally " refer to directions going from one sidewall portion 13,14 of the tire towards the other sidewall portion 13,14 of the tire.

A central groove 17 in the tread portion extends circumferentially about the tread portion 16 and is intersected by the centerplane CP. On one side of the central groove 17, the tread portion is devoid of any grooves, and on the other side of the central groove the tread portion has at least two grooves 18,19 therein which extend circumferentially about the tread. It is understood that the number of circumferentially extending grooves in the tread may be varied by a tire designer depending upon the size of the tire.

The tread portion 16 had a radially outer surface 20 that generally follows a single radius of curvature laterally cross a central portion A of the tread, with the center of said radius of curvature being located on said centerplane CP. The central portion A of the treat 16 extends on each side of the centerplane CP a lateral distance equal at least to the distance from the centerplane CP to the laterally inner edge of the laterally outermost circumferentially extending groove 19. That is to say, the general curvature of the outer surface of the tread portion, disregarding the grooves in the tread, is symmetrical about the centerplane CP of the tire, and has single radius of curvature in the central portion A of the tread. It is important in the practice of the invention that the shoulder portions B,C of the tire are substantially the same thickness as one another.

The circumferentially extending grooves 17,18,19 each have a lateral cross-section that is asymmetrical. More specifically, each of the circumferentially extending grooves 17,18,19 has a pair of walls 22,23; 24,25; 26,27 which extend from a radially outer surface 20 of the tread portion to a radially innermost portion of the groove. For each groove, the slope of its two walls are different from one another. The wall 23,25,27 of each groove that is most distant from the portion of the tread that is devoid of grooves has a lesser slope than the other wall 22,24,26 of the same groove. As used herein, the slope of a grooved wall is understood to be the ratio of the radial depth of the groove to the lateral length of the grooved wall. This feature of the invention reduces the possibility of tearing, chunking, and rib undercutting which can be caused by lateral forces on the ribs due to camber and yaw when the tire is used on an aircraft.

Preferably, the central groove 17 has a greater depth $Y_1$ than the other grooves 18,19 and the $Y_2,Y_3$ of each of the other circumferentially extending grooves is less than the depth of the next adjacent laterally inward circumferentially extending groove, that is to say the depth $Y_2$ of the intermediate groove 18 is less than the depth $Y_1$ of the central groove 17, and the depth $Y_3$ of the laterally outermost groove 19 is less than the depth $Y_2$ of the intermediate groove 18. As used herein, the depth of a groove is understood to refer to the distance from the outer surface 20 of the tread to the radially innermost portion of a groove taken along a line that is perpendicular to the axis of rotation of the tire. This feature of the invention is especially desirable if the tire has a bias ply construction because the load decreases toward the shoulder portions B,C resulting in slower wear.

Preferably, the central groove 17 has a greater lateral width $X_1$ than the other grooves 18,19. The lateral width $X_2,X_3$ of the other grooves 18,19 is less than the lateral width of the next adjacent laterally inward circumferentially extending groove. That is to say, the lateral width $X_2$ of the intermediate groove 18 is less than the lateral width $X_1$ of the central groove 17, and the lateral width $X_3$ of the laterally outermost groove 19 is less than the lateral width $X_2$ of the intermediate groove 18. This feature of the invention is desirable because if groove width is coordinated with groove depth in a positive manner, the tendency to experience groove cracking is reduced. Also, wear rates may increase as groove widths increase.

Figure 3:
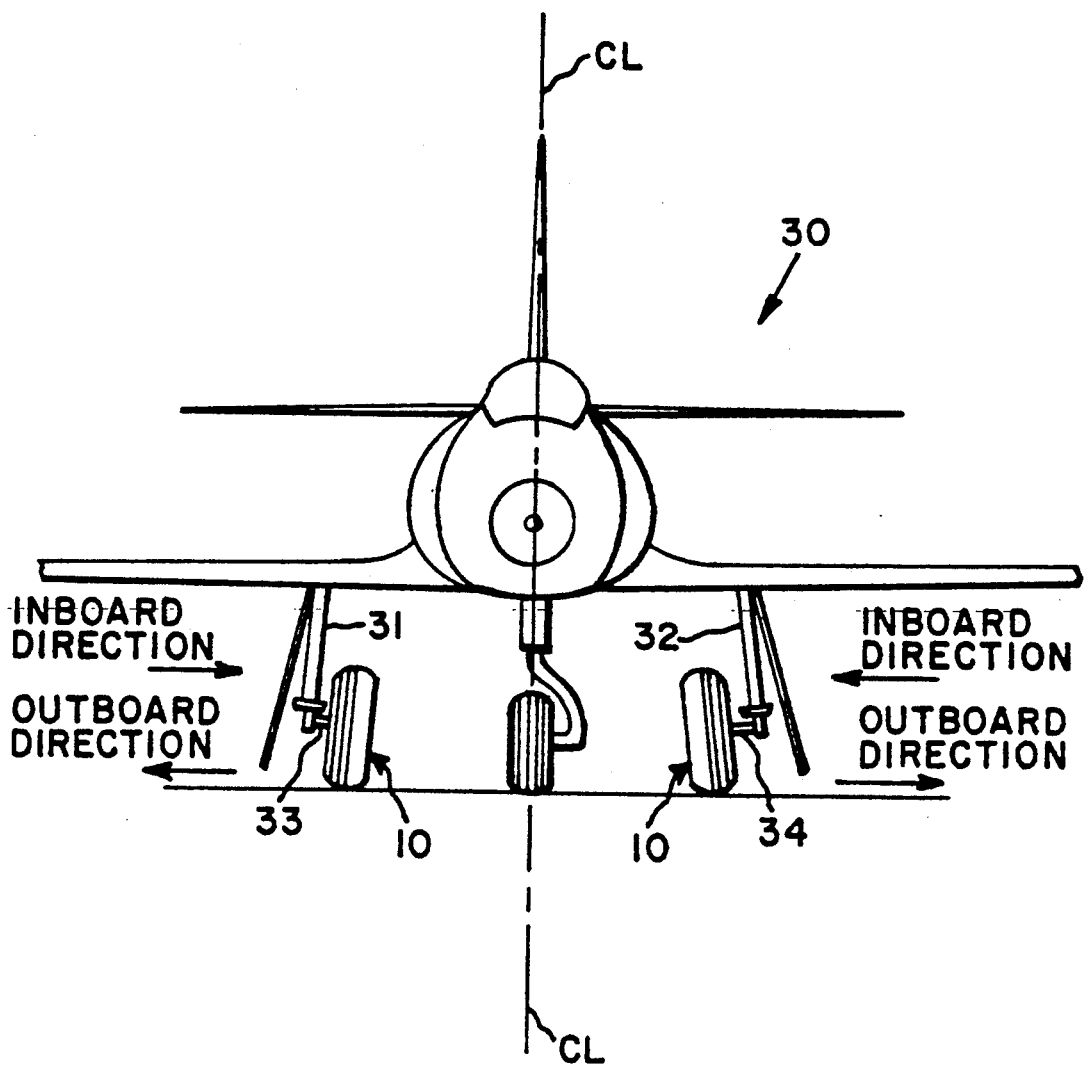
FIG. 3 is a head-on view of an aircraft equipped with tires according to the invention mounted in proper relationship to the cambered landing gear assemblies.

With reference to FIG. 3, the proper installation of tires 10 of the invention upon an aircraft 30 can be described. Tires according to the invention are intended for use upon an aircraft having landing gear struts 31,32 which are disposed at an angle that is not parallel to the centerline CL of the aircraft 30 when the landing gear is in position for the aircraft to taxi. The landing gear struts are suitably adjoined to the landing gear axles 33,34 such that the landing gear axles are not perpendicular to the centerline CL of the aircraft. A wheel (not shown in FIG. 3) is attached to the landing gear axle 33,34 and a tire 10 is mounted upon the wheel. The tires 10 are mounted upon the aircraft 30 such that the portion of the tread which is devoid of grooves is inboard, that is to say nearer to the centerline CL of the aircraft. The portion of the tread that has the circumferentially extending grooves therein is disposed outboard with respect to the centerline CL of the aircraft. It should be noted that even if the landing gear struts 31,32 should be located inboard of the tires, the tires should still be mounted such that the portion of the tread which is devoid of grooves is nearer to the centerline CL of the aircraft.

While certain representative details and embodiments have been shown for the purpose of illustrating the invention, it will be apparent to those skilled in the art that various changes and modifications may be made therein without departing from the spirit or scope of the invention.

We claim:

1. The combination of an aircraft and a pair of tires mounted upon the landing gear of an aircraft, said aircraft comprising a pair of landing gear struts which are disposed at an angle that is not parallel to a centerline of the aircraft when the landing gear is in position for the aircraft to taxi, each said landing gear strut being adjoined to a landing gear axle such that the axle is not perpendicular to the centerline of the aircraft, a wheel is attached to each said landing gear axle and a tire is mounted upon each said wheel, each said tire comprising:

(a) a carcass structure and belt structure which are symmetrical with respect to a centerplane that is perpendicular to the axis of rotation of the tire and is disposed midway between a pair of sidewall portions of the tire; and (b) a tread portion disposed radially outwardly of said carcass structure and belt structure, the tread portion having a radially outer surface that generally follows a single radius of curvature laterally across a central portion of the tread with the center of said radius of curvature being located on said centerplane, a central groove in the tread portion extends circumferentially thereabout and is intersected by said centerplane, on one side of the central groove the tread portion is devoid of any other grooves and on the other side of the central groove the tread portion has at least two other grooves therein which extend circumferentially thereabout, each central portion extending on each side of said centerplane a lateral distance at least equal to the distance from the centerplane to the laterally innermost edge of the laterally outermost circumferentially extending groove, each central groove having a greater depth and lateral width than the other grooves, the depth and lateral width of the other circumferentially extending grooves begin less than the depth and lateral width of the next adjacent laterally inward circumferentially extending groove, each said tire being mounted upon the aircraft such that the portion of the tread which is devoid of grooves is inboard with respect to the centerline of the aircraft, and the portion of the tread that has the circumferentially extending grooves therein is disposed outboard with respect to the centerline of the aircraft.

2. The combination according to claim 1 wherein each said tire is characterized by each of the circumferentially extending grooves having a lateral cross section that is asymmetrical.

* * * * *